United States Patent Office 3,523,119
Patented Aug. 4, 1970

3,523,119
PROCESS OF PRODUCING PYRIMIDINE-5-CAR-
BOXYLIC ACID WITH A BASIC SUBSTITUENT
IN THE 4-POSITION
Christian Jutz, Munich, Germany, and Werner Mueller, Germantown, Pa., assignors to Byk-Gulden Lomberg Chemische Fabrik G.m.b.H., Constance, Germany, a corporation of Germany
No Drawing. Filed Sept. 26, 1967, Ser. No. 674,695
Claims priority, application Germany, June 2, 1967, 1,670,233
Int. Cl. C07d 51/42
U.S. Cl. 260—256.4                  13 Claims

ABSTRACT OF THE DISCLOSURE

An improved process of producing known 5-pyrimidine carboxylic acids which have a basic group in the 4-position using the readily available malonic acid dinitrile or dimethylamino methylene malonic acid dinitrile and dimethyylformamide chloride as starting reactants, reacting said reactants at a temperature between 10° C. and 110° C., preferably in the presence of an inert solvent, to yield 1 - dimethylamino - 3 - chloro-4-cyano-2-azapentadiene-5-dimethyliminium chloride which is preferably purified by conversion into the perchlorate, replacing the chlorine atom in 3-position by an amino group to yield the corresponding 1-amino-1-dimethylamino methylene amino-3-dimethyliminium-2-cyano propene-(1) compound, causing ring closure of the corresponding 4-amino-5-cyano pyrimidine compound by reaction with ammonia, and saponifying the cyano group to the carboxyl group.

Examples of such intermediates and final products are:
(a) 1 - dimethylamino - 3 - chloro-4-cyano-2-azapentadiene - 5 - dimethyliminium perchlorate→1-(3' - trifluoro methyl anilino)-1-dimethylamino methylene amino-3-dimethyliminium-2-cyano propene-(1) perchlorate→4-(3'-trifluoro methyl anilino)-5-cyano pyrimidine→4-(3'-trifluoro methyl anilino) pyrimidine-5-carboxylic acid.
(b) 1 - dimethylamino - 3 - chloro-4-cyano-2-azapentadiene - 5-dimethyliminium perchlorate→1-(2',3'-dimethylanilino)-1-dimethylamino methylene amino-3-dimethyliminium - 2 - cyano propene-(1) perchlorate→4-(2',3'-dimethyl anilino)-5-cyano pyrimidine→4-(2',3'-dimethylanilino)pyrimidine-5-carboxylic acid.

In a similar manner there are obtained 4-dimethylamino-5-cyano pyrimidine→4-dimethylamino pyrimidine-5-carboxylic acid or 1-(N-methylanilino)-1-dimethylamino methylene amino-3-dimethyliminium-2-cyano propene-(1) perchlorate→4-(N-methylanilino)-5-cyano pyrimidine→4-(N-methyl anilino) pyrimidine-5-carboxylic acid.

The process has the advantage over known processes of producing the respective pyrimidine-5-carboxylic acids that the starting materials are readily available, that the reaction steps are carried out in a simple manner and without any considerable expenditures, and that the resulting intermediates are obtained in a pure state and a high yield.

BACKGROUND OF THE INVENTION

The present invention relates to an improved process of producing substituted pyrimidine carboxylic acids and more particularly to a process of producing 4-amino substituted pyrimidine-5-carboxylic acid compounds, and to new products and intermediate products obtained thereby.

Esters of pyrimidine carboxylic acids which are substituted by a dimethylanilino group are described in U.S. Pat. No. 3,254,086.

Pyrimidine carboxylic acids which are substituted by an anilino group substituted in their phenyl ring by the trifluoromethyl groups are produced according to U.S. Pat. No. 3,254,087.

The compounds described in said patents possess valuable pharmaceutical properties and are useful antiphlogistic, analgesic, and antirheumatic agents.

The known processes of producing said compounds have a number of disadvantages. The starting materials used are of a complicated structure and are not readily available. The yield is low. The process steps are quite complicated and require considerable expenditures. Thus preparation of such pyrimidine carboxylic acid compounds on a large scale is rather difficult, if not impossible.

SUMMARY OF THE INVENTION

It is one object of the present invention to provide a simple process of producing substituted pyrimidine carboxylic acid compounds in a high yield which process overcomes the disadvantages of the known processes.

Another object of the present invention is to provide new and valuable intermediate products useful in the synthesis of such substituted pyrimidine carboxylic acid compounds.

A further object of the present invention is to provide new and valuable substituted 5-cyano pyrimidine compounds.

Still another object of the present invention is to provide the new and valuable 1-dimethylamino-3-chloro-4-cyano-2-azapentadiene-5-dimethyliminium chloride compounds as well as corresponding compounds wherein the 3-chlorine atom is replaced by a secondary or tertiary amino group.

Other objects and advantageous features of the present invention will become apparent as the description proceeds.

The process according to the present invention has proved of value in the preparation of substituted pyrimidine carboxylic acids of Formula I

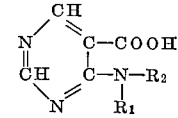

wherein:

$R_1$ is hydrogen, alkyl with 1 to 5 carbon atoms, or benzyl and
$R_2$ is alkyl with 1 to 5 carbon atoms or the group

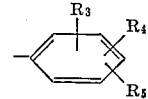

wherein $R_3$, $R_4$, and $R_5$ are the same or different substituents, such as hydrogen, halogen, especially chlorinse or bromine, alkyl with 1 to 5 carbon atoms, alkenyl with 2 to 5 carbon atoms, or the trifluoro methyl, nitro, lower alkoxy, or sulfonamido group.

In principle, such substituted pyrimidine carboxylic acid compounds are produced as illustrated by the reaction equations given on the attached drawings. According to said equations about one mole of malonic acid dinitrile of Formula II are reacted with about two moles of dimethyl formamide chloride of Formula III, preferably in an inert organic solvent such as a halogenated aliphatic hydrocarbon, for instance, chloroform, carbon tetrachloride, triethylene chloride, or an aromatic hydrocarbon, for instance, benzene or tulene, at a temperature between about 10° C. and about 110° C. and preferably between about 10° C. and about 80° C. (reaction step A). Thereby, 1-dimethylamino-3-chloro-4-cyano-2-azapentadiene-5-dimethyliminium chloride is obtained. Said compound can readily be converted into its perchlorate of Formula IV by reaction with sodium perchlorate. The perchlorate is obtained in a good yield and in a substantially pure state. In place of the perchlorate, there may be prepared other salts, such as the picrate, styphnate, picronolate, hexachloro platinate, and others although the perchlorate is the preferred salt.

In place of malonic acid dinitrile, the reaction may also be carried out by using dimethylamino methylene malonic acid dinitrile of Formula V as the one reaction component

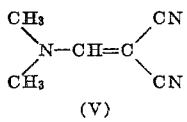

(V)

Said compound V is reacted with one mole of dimethyl formamide chloride of Formula III and yields also 1-dimethylamino-3-chloro - 4 - cyano-2-azapentadiene-5-dimethyliminium perchlorate of Formula IV. The dimethylformamide chloride is preferably used in status nascendi, i.e. the formulation mixture of dimethylformamide and oxalylchloride, phosphorus oxychloride, and the like is employed.

In reaction step B the chlorine atom in 3-position can readily be exchanged by amino groups by reaction with primary or secondary amines of Formula VI, preferably with primary or secondary lower aliphatic amines or with aromatic amines, for instance, with dimethylamine, aniline, N-methyl aniline, 2,3-dimethyl aniline, 3-trifluoro methyl aniline, and others. Preferably said exchange of chlorine in the compound of Formula V by the amino group

is also effected in the presence of an inert organic solvent as mentioned hereinabove. In this manner, the 1-dimethylamino-3-amino - 4 - cyano-2-azapentadiene-5-dimethyliminium perchlorate of Formula VII, which may also be designated as N,N-dimethyl-5-dimethylamino-3-amino-2-cyano-4-azapenta-2,4 diene iminium perchlorate or as 1-amino-1-dimethylamino methylene amino-3-dimethyliminium-2-cyano propene-(1) perchlorate, is obtained. When using, for instance, 3-trifluoro methylaniline as amine in this exchange reaction of step B, 1-(3'-trifluoro methyl anilino)-1-dimethylamino methylene-3-dimethyliminium-2-cyano propene-(1) perchlorate is obtained.

According to reaction step C ring closure is effected on treating said compounds of Formula VII with ammonia, preferably while heating. Thereby, correspondingly 4-substituted 5-cyano pyrimidine compounds of Formula VIII are formed.

On heating the chloro compound of Formula VII with aqueous ammonium chloride solution or with dilute ammonia solution, 4-dimethylamino-5-cyano pyrimidine is directly obtained by ring closure and substitution of the chlorine atom by the dimethylamino group.

In order to produce the 4-basically substituted pyrimidine-5-carboxylic acid compounds of Formula IX, the cyano group in the compound of Formula VIII is saponified according to reaction step D preferably by means of aqueous sulfuric acid or alcoholic alkali metal hydroxide solution.

As stated above, this chemically novel process has the advantage over the processes described in the cited U.S. patents, that readily available starting materials of simple structure are used. All the reaction steps are very simple and can be carried out without any considerable expenditure in labor, energy, time, and apparatus. The yield is in general excellent and the reaction products can readily be obtained in a pure state. The process according to this invention thus represents a noteworthy technical advance in the art of synthesizing such substituted pyrimidine carboxylic acid compounds.

DETAILED DESCRIPTION OF INVENTION

The following examples serve to illustrate the present invention without, however, limiting the same thereto.

EXAMPLE 1

1-dimethylamino-5-dimethyliminium-3-chloro-2-cyano-4-azapentadiene-(1,3) perchlorate (Formula IV)

13.2 g. of malonic acid dinitrile dissolved in 20 cc. of chloroform are added drop by drop to a formulation mixture of 47.5 g. of dimethylformamide and 51.3 cc. of oxalylchloride in 120 cc. of chloroform. The mixture is heated to 64° C. for a short period of time. Thereby vigorous reaction takes place, hydrogen chloride evolves, and the initially yellow reaction mixture becomes dark brown. After the reaction has ceased, the chloroform is removed by vacuum distillation. The pasty residue is extracted twice, each time with 90 cc. of ether. A solution of 25 g. of sodium perchlorate in 200 cc. of water is then added while stirring and cooling. Thereby, yellow crystals precipitate. They are filtered off by suction and are recrystallized from a mixture of acetonitrile and ether (1:1). They correspond to the empirical formula $[C_9H_{14}N_4Cl]ClO_4$ Melting point: 171° C. Yield: 51 g. corresponding to 81% of the theoretical yield.

EXAMPLE 2

The same compound is obtained by heating 2.4 g. of dimethylamino methylene malonic acid dinitrile and 3.84 g. of dimethylformamide chloride, obtained from 2.2 g. of dimethylformamide and 2.0 cc. of oxalylchloride, in 20 cc. of chloroform for about one hour. The reaction mixture is worked up as described in Example 1. 5 g. of the perchlorate of 1-dimethylamino-5-dimethyliminium-3-chloro-2-cyano-4-azapentadiene-(1,3), corresponding to 80% of the theoretical yield, are obtained.

EXAMPLE 3

1-(3'-trifluoro methyl anilino)-1-dimethylamino methylene amino-3-dimethyliminium - 2 - cyano propene-(1) perchlorate (Formula VII)

A mixture of 31.25 g. of the perchlorate obtained according to Example 1 or 2, 49.0 g. of 3-trifluoro methyl aniline, and 100 cc. of chloroform are boiled under reflux for 30 minutes. The chloroform is distilled off. The residue is extracted twice, each time with 70 cc. of ether in order to remove unreacted 3-trifluoro methyl aniline. The resulting residue can be used without further purification in the ring closure step of the following example.

EXAMPLE 4

4-(3'-trifluoro methyl anilino)-5-cyano pyrimidine
(Formula VIII)

200 cc. of an aqueous 25% ammonia solution are added to the residue obtained according to Example 3. The mixture is boiled for 20 minutes. After cooling, the 4-(3'-trifluoro methyl aniline)-5-cyano pyrimidine crystallizes. Its melting point, after recrystallization from ethanol, is 164–165° C. Yield: 19.1 g. corresponding to 72.3% of the theoretical yield.

EXAMPLE 5

4-(3'-trifluoro methyl anilino) pyrimidine-5-carboxylic acid (Formula IX)

2.1 g. of 4-(3'-trifluoro methyl anilino)-5-cyano pyrimidine obtained according to Example 4 are heated on the boiling water bath with 42.0 g. of 75% sulfuric acid for 8 hours. The reaction mixture is then poured on about 80 g. of ice. The white crystalline precipitate is filtered off by suction, washed with water until of neutral reaction and dissolved in 2 N sodium hydroxide solution. 2 N hydrochloric acid is added to said alkaline solution until its pH-value is adjusted to a pH of 6.3. Thereby, 4-(3'-trifluoro methyl anilino)pyrimidine-5-carboxylic acid crystallizes. Melting point: 231–232° C. Yield: 1.73 g. corresponding to 76.5% of the theoretical yield.

EXAMPLE 6

3.1 g. of the perchlorate obtained according to Example 1 or 2 are heated under reflux with 12.1 g. of 2,3-dimethyl aniline and 20 cc. of chloroform for 20 minutes. Thereafter, the reaction mixture is concentrated by evaporation in a rotating evaporator. The residue is digested three times, each time with 30 cc. of ether. The resulting residue is the 1-(2',3'-dimethylanilino)-1-dimethylamino methylene amino-3-dimethyliminium-2-cyano propene-(1) perchlorate which can be used without further purification in the following reaction step.

EXAMPLE 7

4-(2',3'-dimethylanilino)-5-cyano pyrimidine
(Formula VIII)

The reaction product obtained according to Example 6 is mixed with 50 cc. of concentrated ammonia. The mixture is heated on the boiling water bath for 20 minutes. The aqueous layer is removed by decanting and the residue is recrystallized first from a mixture of 20 cc. of ethanol and 5 cc. of water and then twice from methanol. 4-(2',3'-dimethylanilino)-5-cyano pyrimidine is obtained in pure condition. Melting point: 202–203.5° C. Yield: 1.8 g. corresponding to 80% of the theoretical yield.

EXAMPLE 8

4-(2',3'-dimethylanilino) pyrimidine-5-carboxylic acid (Formula IX)

1.5 g. of the nitrile obtained according to Example 7 are treated on the boiling water bath with 20 cc. of 75% sulfuric acid for 2¼ hours. The resulting reaction mixture is poured on about 60 g. of ice. The precipitate is filtered off by suction, dissolved in 40 cc. of 2 N sodium hydroxide solution, and filtered. The filtrate is acidified to a pH of 6.3 by the addition of 2 N hydrochloric acid. The resulting precipitate is filtered off by suction, washed with a small amount of water, and recrystallized from a mixture of dimethylformamide and water (1:1). Thereby, the above-mentioned pyrimidine carboxylic acid is obtained in pure condition with ½ mole of water of crystallization. Melting point: 251–252° C. Yield: 1.1 g. corresponding to 68% of the theoretical yield.

EXAMPLE 9

4-dimethylamino-5-cyano pyrimidine 6.3 g. of 1-dimethylamino-5-dimethyliminium-3-chloro-2-cyano-4-azapentadiene-(1,3) perchlorate obtained according to Example 1 or 2 are heated on the boiling water bath with 50 cc. of a saturated ammonium chloride solution and 1 cc. of concentrated ammonia solution for 10 minutes. On cooling, needles of 4-dimethylamino-5-cyano pyrimidine precipitate from the resulting clear reaction solution. The residue of the combined and dried extracts is recrystallized from isopropanol or a small amount of water. White needles of the melting point 114° C. are obtained. Yield: 1.7 g. corresponding to 58% of the theoretical yield.

EXAMPLE 10

1-(N-methyl anilino)-1-dimethylamino methylene amino-3-dimethyliminium-2-cyano propene-(1) perchlorate 3.13 g. of 1-dimethylamino-5-dimethyliminium-3-chloro-2-cyano-4-azapentadiene-(1,3) perchlorate obtained according to Examples 1 or 2 and 3.2 g. of methylaniline are heated in a small amount of chloroform for 15 minutes. The reaction mixture is triturated with ether whereby 1-(N-methyl anilino)-1-dimethylamino methylene amino-3-dimethyliminium-2-cyano propene-(1) perchlorate and methyl aniline hydrochloride precipitate as crystals. On recrystallization from a mixture of acetonitrile and acetic acid ethyl ester, the perchlorate melts at 192° C.

EXAMPLE 11

4-(N-methyl anilino)-5-cyano pyrimidine

The compound obtained according to Example 10 is treated with 20 cc. of dilute ammonia and the reaction mixture is worked up as described, for instance, in Example 4. White needles of the above mentioned substituted pyrimidine nitrile are obtained. Melting point: 92° C. on recrystallization from a mixture of ethanol and water. Yield: 1.7 g. corresponding to 81% of the theoretical yield.

EXAMPLE 12

1-anilino-1-dimethylamino methylene amino-3-dimethyliminium-2-cyano propene-(1) perchlorate The procedure is the same as described in Example 10, whereby, in place of methyl aniline, 3 g. of aniline are reacted.

EXAMPLE 13

4-anilino-5-cyano pyrimidine

The procedure is the same as described in Example 11, whereby, however, the reaction product obtained according to Example 12 is employed as starting material in the ring closure reaction. The resulting 4-anilino-5-cyano pyrimidine is obtained in the form of white needles of the melting point of 168° C.

Of course, the nitriles obtained according to Examples 9, 11, and 13 can readily be converted into the corresponding 4-basically substituted pyrimidine-5-carboxylic acids by saponification with dilute sulfuric acid as described in Examples 5 and 8. Saponification of said nitriles to the corresponding carboxylic acids can also be effected by means of alcoholic sodium or potassium hydroxide solution.

In place of 3-trifluoro methyl aniline, 2,3-dimethylaniline, methyl aniline, and aniline, there may be employed equimolecular amounts of other primary and secondary lower aliphatic amines or aromatic amines, such as dimethylamine, n-butylamine, allylamine, o-, m- or p-toluidines, p-ethyl aniline, p-isobutyl aniline, o-, m-, or p-chloro anilines, o-, m-, or p-nitro anilines, 2,4-dichloro aniline, 2,4,6-trichloro aniline, 2,4- or 2,6-dinitro anilines, 2,6-dinitro p-toluidine, N-ethyl, N-isopropyl, N-butyl or N-allyl anilines, o- or p-anisidines, N-methyl-o-anisidine, p-phenetidine, p-sulfonamido aniline, p-sulfonyl-N-butyl-amido aniline, and others, while otherwise the procedure is the same as described in the preceding examples.

In place of the perchlorate of 1-dimethylamino-5-dimethyliminium-3-cyano-4-azapentadiene-(1,3) prepared as described in Examples 1 and 2, there may also be prepared the styphnate, the picrate, the picronolate, the hexachloro platinate of said compound, although the perchlorate is the preferred salt. Such other salts are prepared in a manner known to the art. They can also be used for reaction with the primary and secondary amines as described for the perchlorate.

It may be mentioned that the dimethyl formamide chloride is preferably used in state nascendi since it is not stable and cannot be stored.

The dimethylamino methylene malonic acid dinitrile used in Example 2 as the one reactant is prepared according to Meerwein et al. "Liebigs Ann. Chem." vol. 641, page 527 (1961) or Eiden "Angew. Chemie" vol. 72, page 71 (1960).

Of course, many changes and variations in the reactants and solvents used, the reaction conditions, temperature and duration, in the methods of isolating and purifying the reaction products, and the like may be made by those skilled in the art in accordance with the principles set forth herein.

Flow sheet of process of invention

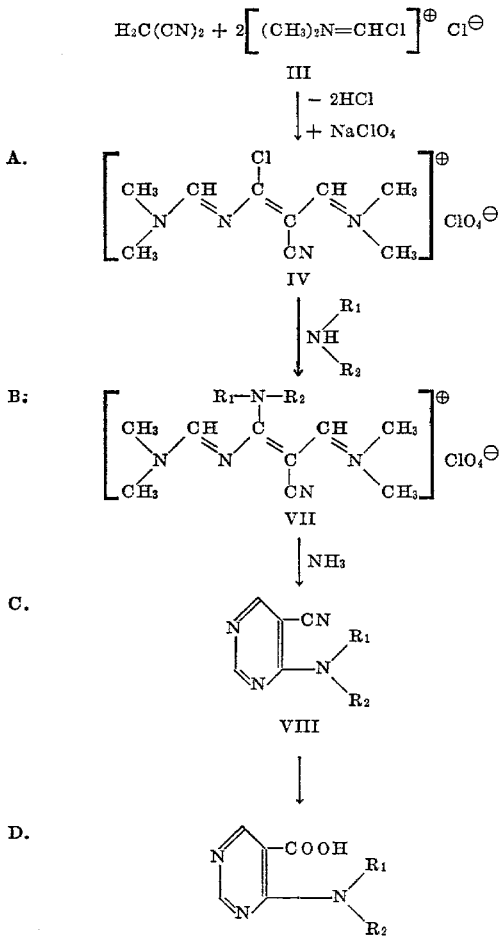

We claim:
1. In a process of producing a pyrimidine-5-carboxylic acid having a basic substituent in 4-position of the formula

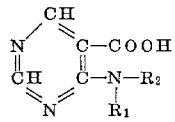

wherein $R_1$ is hydrogen, alkyl of 1 to 5 carbon atoms or benzyl and $R_2$ is alkyl of 1 to 5 carbon atoms or

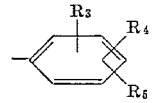

wherein $R_3$, $R_4$ and $R_5$ are the same or different and are hydrogen, a halogen atom, alkyl of 1 to 5 carbon atoms, alkenyl of 2 to 5 carbon atoms, trifluoromethyl, nitro, lower alkoxy or sulfamido, the steps which comprise
 (a) reacting about one mole of malonic acid dinitrile with about two moles of dimethylformamide chloride at a temperature between about 10° C. and about 110° C.,
 (b) reacting the resulting 1-dimethylamino-3-chloro-4-cyano-2-azapentadiene-5-dimethyliminium compound with a primary or secondary amine of the formula

wherein $R_1$ and $R_2$ are as defined above to replace the chlorine atom by an amino group,
 (c) treating the resulting 1-amino-1-dimethylamino methylene amino-3-dimethyliminium-2-cyano propene-(1) compound with ammonia in solution under the influence of heat to promote ring closure, and
 (d) converting the —CN group of the resulting 4-amino-5-cyano pyrimidine to the —COOH group in the corresponding pyrimidine-5-carboxylic acid having a basic substituent in the 4-position.

2. The process according to claim 1, wherein step (a) is carried out at a temperature between about 10° C. and 80° C.

3. The process according to claim 1, wherein step (a) is carried out in an inert organic solvent.

4. The process according to claim 1, wherein step (b) is carried out in an inert organic solvent.

5. The process according to claim 1, wherein steps (a) and (b) are carried out in an inert organic solvent selected from the group consisting of a halogenated lower aliphatic hydrocarbon, benzene, and toluene.

6. The process according to claim 1, wherein the 1-dimethylamino-3-chloro-4-cyano-2-azapentadiene-5-dimethyliminium compound obtained in step (a) is converted into its perchlorate by reaction with an alkali metal perchlorate and wherein said perchlorate is subjected to step (b).

7. The process according to claim 1, wherein the amine used in step (b) to replace the chlorine atom is an amine selected from the group consisting of a lower aliphatic primary amine, a lower aliphatic secondary amine, a mononuclear aromatic primary amine, and a mononuclear aromatic secondary amine.

8. The process according to claim 1, wherein the amine used in step (b) to replace the chlorine atom is 2,3-dimethyl aniline.

9. The process according to claim 1, wherein the amine used in step (b) to replace the chlorine atom is 3-trifluoro methyl aniline.

10. The process according to claim 1, wherein the amine used in step (b) to replace the chlorine atom is methyl aniline.

11. The process which comprises reacting a dimethylamino methylene malonic acid dinitrile of the formula

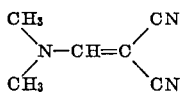

with about one mole of a dimethyl foramide chloride forming a 1- dimethylamino-3-chloro-4-cyano-2-azapentadiene-5-dimethyliminium compound and continuing the reaction in accordance with steps (b) to (d) of claim 1.

12. The process according to claim 1, wherein ring closure in step (c) is effected by heating with aqueous ammonia solution.

13. The process according to claim 1, wherein the conversion of the —CN group of the 4-amino-5-cyano pyrimidine in step (d) is effected by heating with aqueous sulfuric acid or an alcoholic alkali metal hydroxide solution.

References Cited
UNITED STATES PATENTS

| | | | |
|---|---|---|---|
| 1,915,334 | 6/1933 | Salzberg et al. | 260—256.4 |
| 2,075,359 | 3/1937 | Salzberg et al. | 260—256.4 |
| 2,425,320 | 8/1947 | Hill | 260—256.4 |
| 2,606,155 | 8/1952 | Hill | 260—256.4 |

ALEX MAZEL, Primary Examiner

R. J. GALLAGHER, Assistant Examiner

U.S. Cl. X.R.

260—239.75, 256.5, 465, 465.5, 999